(12) United States Patent
Iwamoto (10) Patent No.: US 6,435,338 B1
(45) Date of Patent: Aug. 20, 2002

(54) SMALL-PARTS FEED AND CONVEYING DEVICE

(75) Inventor: Kazuo Iwamoto, Hachioji (JP)

(73) Assignee: Humo Laboratory, Ltd., Tokyo (JP)

( * ) Notice: Subject to any disclaimer, the term of this patent is extended or adjusted under 35 U.S.C. 154(b) by 0 days.

(21) Appl. No.: 09/810,212

(22) Filed: Mar. 19, 2001

(51) Int. Cl.7 .............................................. B65G 17/46
(52) U.S. Cl. ....................... 198/803.5; 406/52; 406/62; 406/78; 198/445; 198/356
(58) Field of Search .............................. 406/52, 62, 78; 198/803.5, 445, 396, 380

(56) References Cited

U.S. PATENT DOCUMENTS

| | | | | |
|---|---|---|---|---|
| 3,204,750 A | * | 9/1965 | Tarzian | 198/33 |
| 3,209,888 A | * | 10/1965 | Sterling | 198/33 |
| 3,285,387 A | * | 11/1966 | Ochs | 198/33 |
| 5,826,696 A | * | 10/1998 | Rupp et al. | 198/392 |

* cited by examiner

Primary Examiner—Christopher P. Ellis
Assistant Examiner—Joe Dillon, Jr.
(74) Attorney, Agent, or Firm—Venable; Gabor J. Kelemen; Robert J. Frank (57) ABSTRACT

A small-parts feed and conveying device includes a movable section in which trains having a plurality of through holes are arranged along a direction of conveying the small parts, a parts drawing means for drawing the small parts to parts-conveying surface and holding them by reducing the pressure of an air opposite thereto, a conveying path cover in which open faces of spaces for conveying the parts slidably come into contact with the parts-conveying surface, and a parts mixing means for blowing a pressurized air to the small parts from nozzles in the conveying path cover and mixing them. The through holes may be arranged so as to form a plurality of parallel trains. The movable section may be a rotor or a belt.

3 Claims, 9 Drawing Sheets

SMALL-PARTS FEED AND CONVEYING DEVICE

BACKGROUND OF THE INVENTION

1. Field of the Invention

The present invention relates to a small-parts feed and conveying device for conveying small parts such as surface-mounted-type electronic parts and general industrial parts, to be assembled in electronic devices or general industrial products, at a high speed in series of processes and for feeding them to the next device for processing.

2. Description of the Related Art

Conventionally, parts feeders for arranging, and constantly and automatically feeding the parts in a specified direction are generally used to convey chip capacitors mounted on a panel and small parts mounted on a general machine and the like to be assembled in the electronic devices to a processing device disposed in the first of a series of processes, or from one processing device to the next processing device.

In the above-mentioned conventional parts feeder, when the parts to be fed include a part having a burr in shape or a part exceeding the tolerance in dimension, the parts may collide with each other to cause an obstruction on the way to the outlet of the apparatus, causing a delay, and after, the outlet itself is blocked.

SUMMARY OF THE INVENTION

Accordingly, it is an object of the present invention to provide a small-parts feed and conveying device in which the above problems are solved so as to prevent delay while conveying the parts and to prevent blocking in the vicinity of the outlet, thereby enabling a high-speed and stable feeding.

In order to achieve the above object, the small-parts feed and conveying device according to the present invention includes a movable section in which trains having a plurality of separated through holes are arranged along the direction of conveying the small parts on a parts-conveying surface, parts drawing means for drawing the small parts during conveyance to the parts-conveying surface and for temporarily holding them by reducing the pressure of the air in the vicinity of the through holes opposite to the parts-conveying surface of the movable section, a conveying path cover in which open faces of spaces in which the small parts are enclosed for conveying slidably come into contact with the parts-conveying surface, and parts mixing means for blowing a pressurized air to the small parts through nozzles provided in the conveying path cover and for mixing the small parts in the conveying path cover.

Specifically, in the small-parts feed and conveying device according to the present invention, a principal composing element of the movable section is a rotor or a belt for conveying. Preferably, the trains having the through holes on the parts-conveying surface of the movable section are plural and are arranged in parallel, the spaces in the conveying path cover for enclosing the small parts are divided corresponding to each of the plurality of trains, and the parts mixing means individually mixes the small parts in the divided spaces.

DESCRIPTION OF THE PREFERRED EMBODIMENT

An embodiment of the present invention will be described hereinbelow with reference to the drawings.

A case where a part to be fed and conveyed is a surface-mounting-type small electronic part (hereinafter referred to as a work) and a movable section of the conveyance device includes a rotary disc (hereinafter referred to as a rotor) will be described as an example of the embodiment of the invention.

Figure 1:
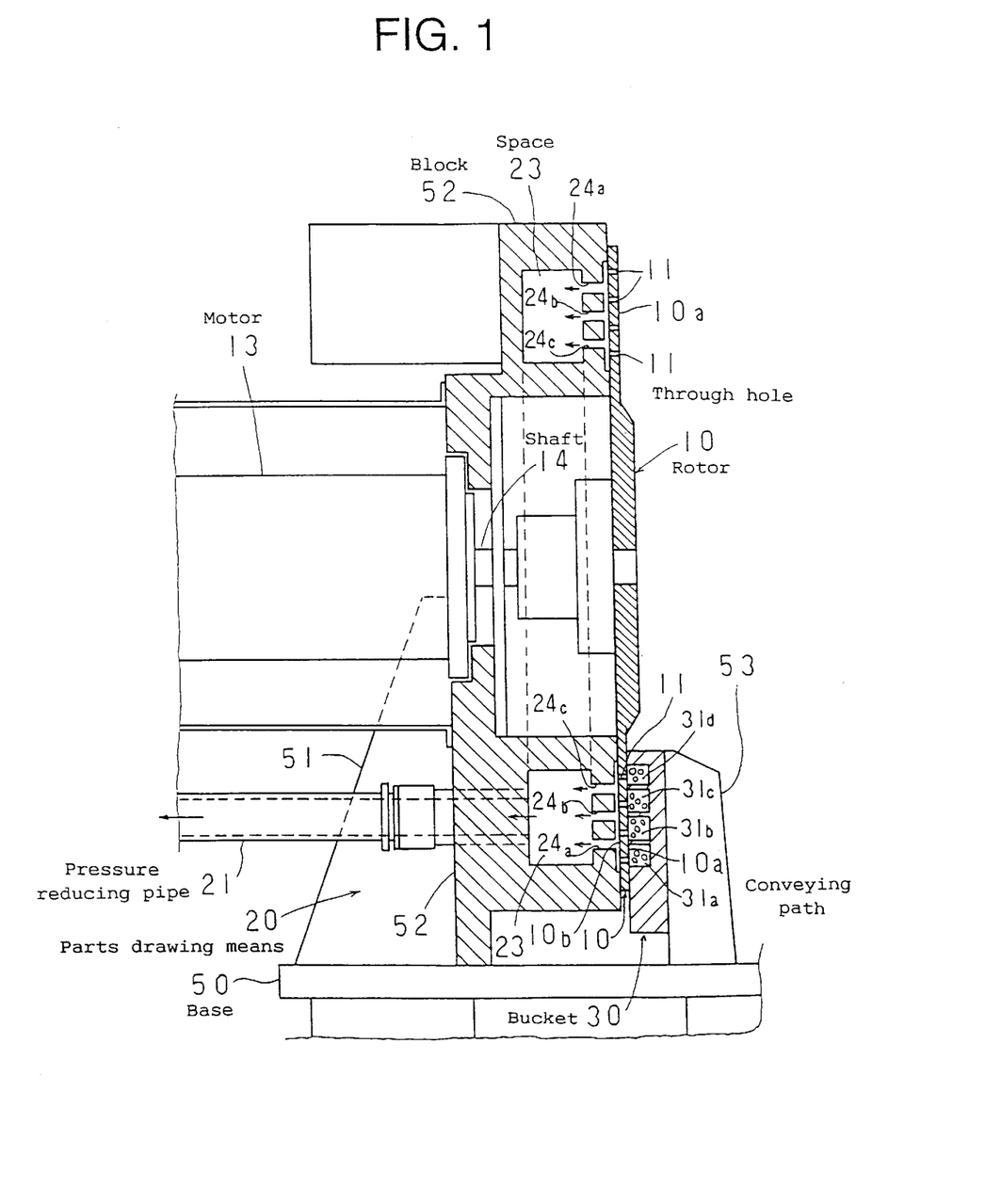
FIG. 1 is a left side view (sectional view) of a principle part of an apparatus including the present invention.
Figure 2:
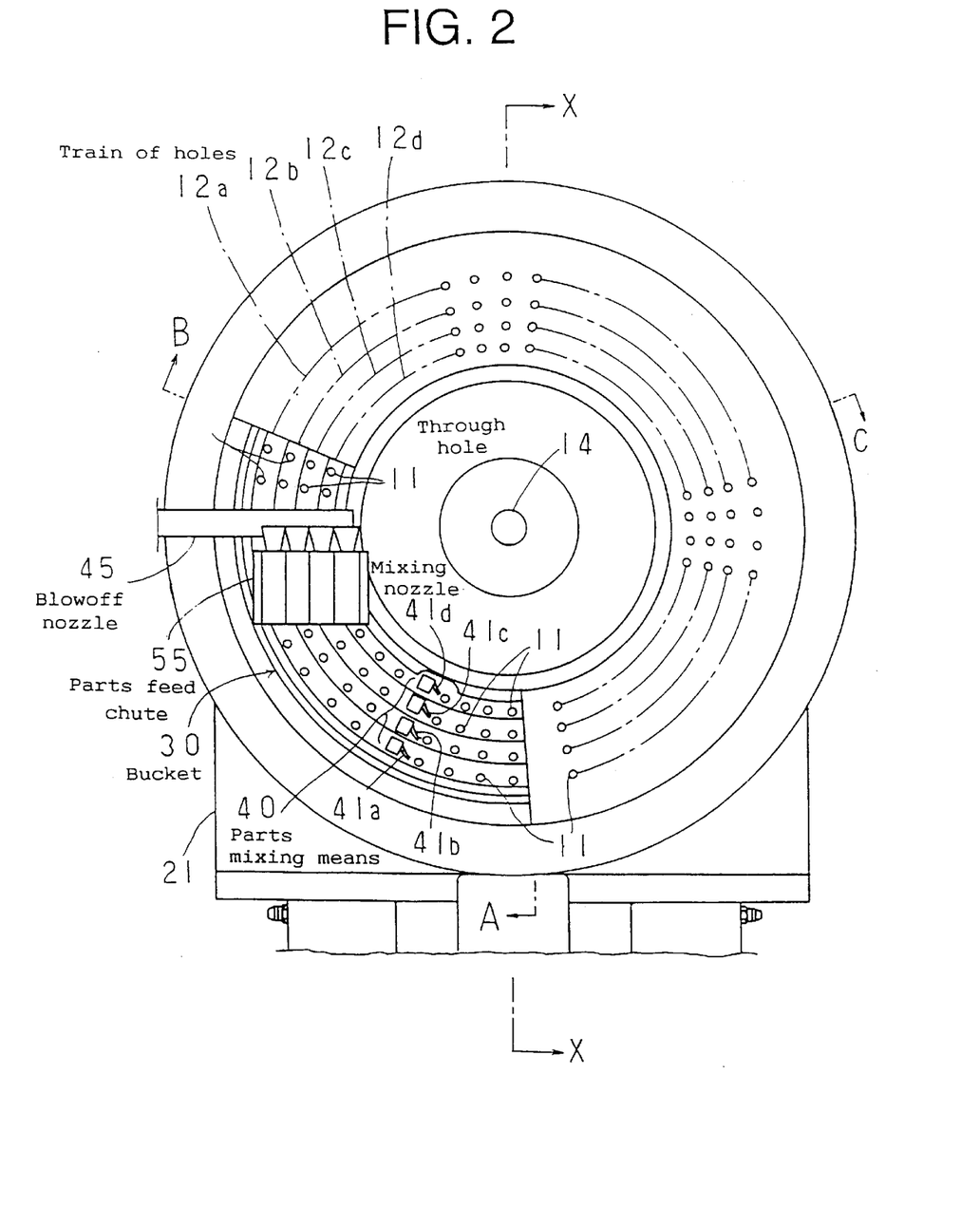
FIG. 2 is a front view of the principle part of the embodiment in FIG. 1.

FIG. 1 is a cross sectional view taken on line X—X in FIG. 2, showing a principal part of a small-parts feed and conveying device of the present invention in which a parts selection mechanism is assembled. FIG. 2 is a front view of the principle part of the small-parts feeding and conveying device of the present invention. As shown in FIGS. 1 and 2, the small-parts feeding and conveying device of the present invention includes a rotor 10, a parts drawing means 20, a conveying path cover (hereinafter referred to as a bucket) 30, and a parts mixing means (not shown).

In the apparatus in FIG. 1, the works are arranged while being conveyed in the clockwise direction on a fan-shaped area of almost 120° from the arrow A to B in FIG. 2. In addition, the fan-shaped area of almost 120° from the arrow B to C in the clockwise direction is for measuring characteristics of the work (electrical characteristics or shape), and the fan-shaped area of almost 120° from the arrow C to A in the clockwise direction is for selecting and removing the work to the outside of the apparatus based on the result of the measurement.

Figure 3:
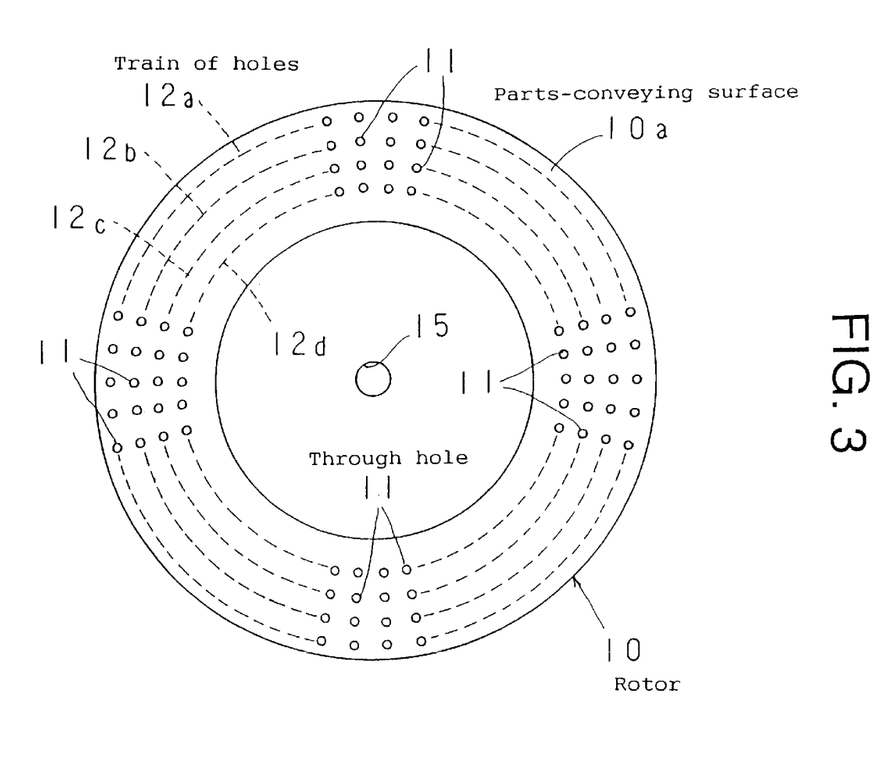
FIG. 3 is a front view of an embodiment of a rotor in a conveyor section of the apparatus in FIG. 1.
Figure 4:
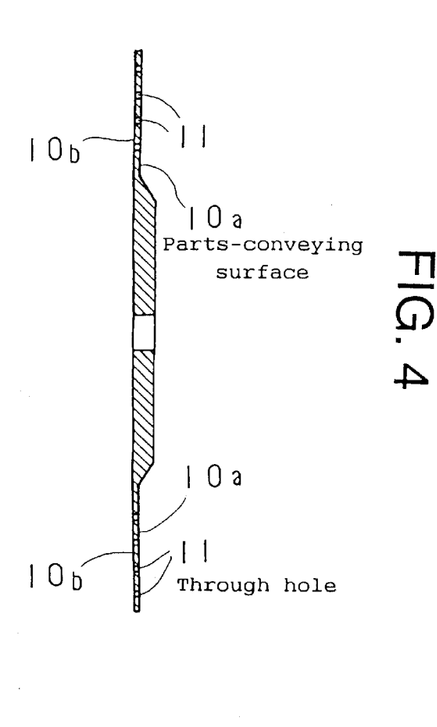
FIG. 4 is a left side view of the rotor in FIG. 3.
Figure 5:
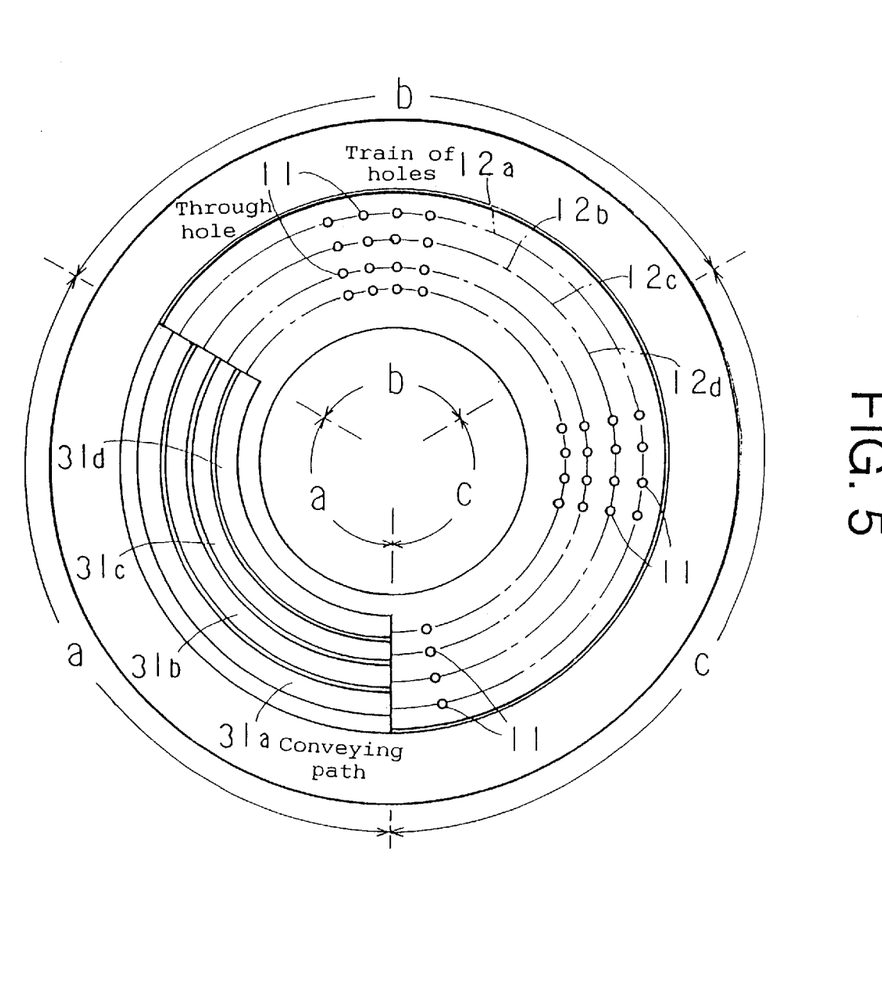
FIG. 5 is a front view of an embodiment of a bucket of the apparatus in FIG. 1.
Figure 6:
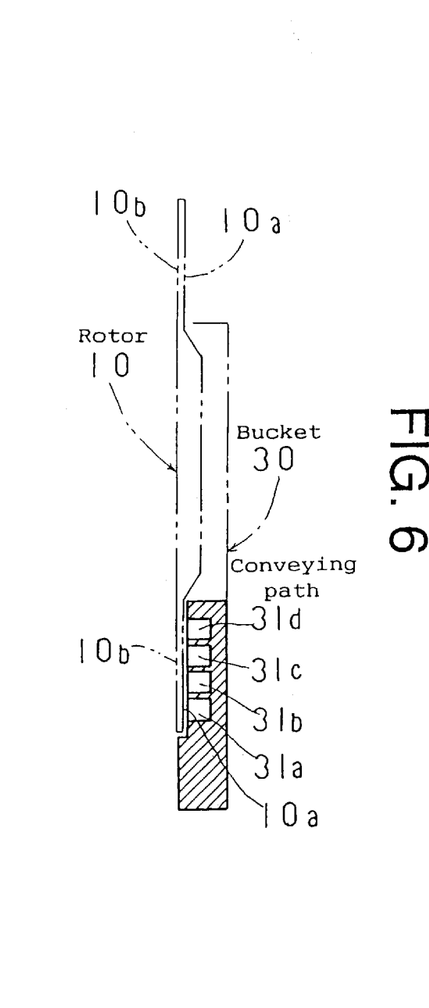
FIG. 6 is a left side view of the bucket in FIG. 1.

FIG. 3 is a front view of an embodiment of the rotor in FIG. 1. FIG. 4 is a left side view of the rotor in FIG. 3. FIG. 5 is a front view of an embodiment of a bucket of the apparatus, which faces the rotor in FIG. 3. FIG. 6 is a left side view of the bucket in FIG. 5. In FIG. 6, the relative position of the rotor 10 to the bucket 30 is shown in dot-dash lines. In FIGS. 5 and 6, only the main body of a bucket is shown, and a parts feed chute, a parts mixing means, and the like are omitted in order to clearly show the structure of the spaces (hereinafter referred to as a conveying path) 31a, 31b, 31c, and 31d for conveying the works within the cover.

The bucket 30 is secured to a base 50 which is fixed to the position for mounting the apparatus via a bucket holder 53. A parts-conveying surface 10a of the rotor 10 faces an open face of the conveying path in the bucket 30 in a state having almost no gap therebetween. A surface 10b, opposite to the parts-conveying surface 10a, faces a surface of a block 52 to which a motor 13 for driving the rotor 10 is mounted. There is almost no gap between the rotor 10 and the block 52 although they are slidable.

The block 52 has a donut-shaped space 23 along trains 12a, 12b, 12c, and 12d of through holes of the facing rotor 10 provided therein in order to reduce the pressure on the surface 10b side of the rotor 10. The rotor 10 is driven by a motor 13, such as a pulse motor or a servomotor, via a shaft 14, and in the case of the apparatus in FIG. 1, which is intermittently rotated clockwise in FIG. 2.

The rotor 10 has the trains 12a, 12b, 12c, and 12d of the plurality of through holes 11, 11 . . . 11 separately arranged. The trains 12a, 12b, 12c, and 12d are arranged in concentric circles along the direction in which the works 1, 1 . . . 1 are conveyed, as shown in the drawing in the apparatus in FIG. 1. The through holes 11, 11 . . . 11 penetrate between the parts-conveying surface 10a and the opposite surface 10b of the rotor 10. Reference numeral 15 denotes a hole for securing the rotating shaft.

The bucket 30 in FIG. 5 has, as a space for conveying the works 1, 1 . . . 1, four ring-shaped conveying paths 31a, 31b, 31c, and 31d each having a notch, and each corresponding to the trains 12a, 12b, 12c, and 12d of the through holes 11, 11 . . . 11, respectively. The conveying paths 31a, 31b, 31c, and 31d are substantially concentric circles with the center of the bucket as the axis.

Part a shown in FIG. 5 corresponds to a part from the arrow A to B in FIG. 2. The bucket 30 covers a section in which the works are arranged while being conveyed. Similarly, part b corresponds to the section from the arrow B to the arrow C in FIG. 2 for measuring the characteristics of the work (for example the capacity of a capacitor or the like). Also, part C corresponds to the section from the arrow C to the arrow A in FIG. 2, for selecting and classifying the works based on the result of the measurement and extracting them to the outside of the apparatus.

Figure 7:
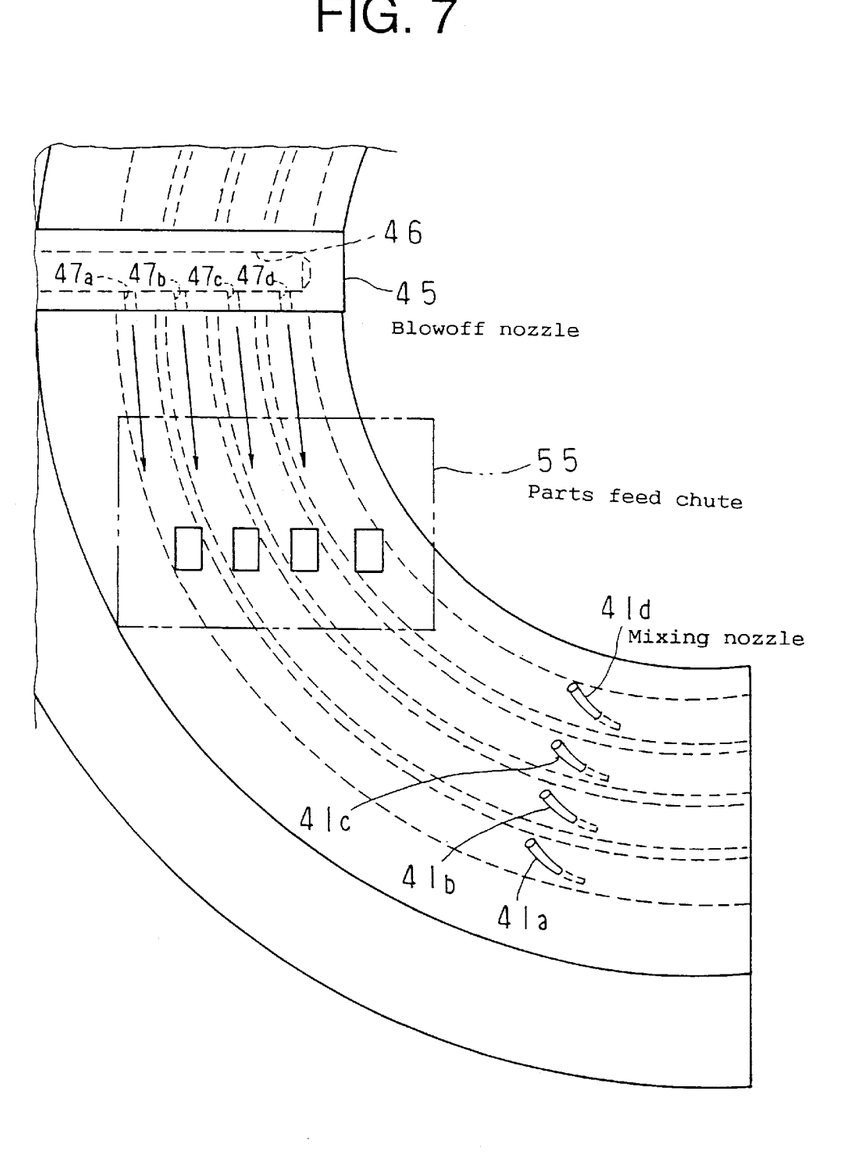
FIG. 7 is an explanatory view showing a position for mounting principal parts on the bucket.

FIG. 7 is an enlarged view of a part in FIG. 2 for showing positions at which the part feed chute 55, mixing nozzles 41a, 41b, 41c, and 41d, and a blowoff nozzle 45 are mounted. The parts feed chute 55 feeds the works 1, 1 . . . 1 from the outside to the conveying paths 31a, 31b, 31c, and 31d.

Figure 12:
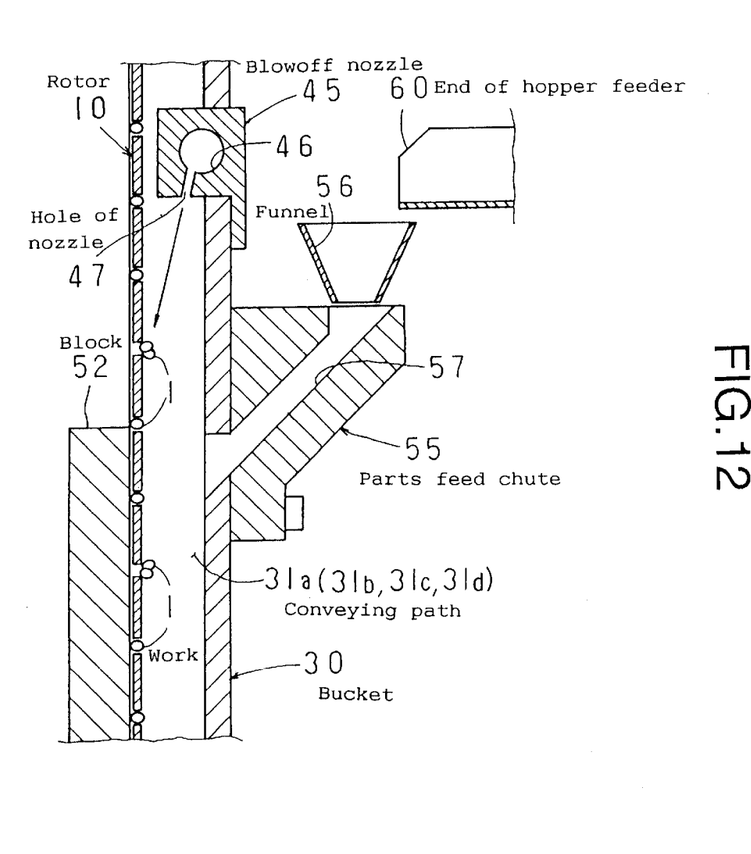
FIG. 12 is an explanatory view (cross sectional view) showing a state of mounting a parts feeding chute and a blowoff nozzle.

In FIG. 12, the works 1 are fed from an end 60 of an outlet of a hopper feeder for enclosing the works 1, 1 . . . 1 to the conveying paths 31a, 31b, 31c, and 31d via funnels 56, 56 . . . 56 and paths 57, 57 . . . 57 provided for each train.

The mixing nozzles 41a, 41b, 41c, and 41d are provided to prevent the works from stopping due to tangling in the conveying paths 31a, 31b, 31c, and 31d. The blowoff nozzle 45 blows off all of the extra works 1, except for only one, by blowing air to remove them when the plurality of works 1, 1 . . . 1 that are drawn into the through holes 11, 11 . . . 11 of the rotor 10 are drawn into one through hole 11.

A parts drawing means 20 comprises a negative pressure supply (not shown), a pressure reducing pipe 21 connected to the negative pressure supply, the space 23 of which the pressure is reduced with the pressure reducing pipe 21, a thin-disc-shaped depression 25 facing the rotor 10, and holes 24, 24 . . . 24 connecting the depression 25 and the space 23. Thus, the pressure in the pressure reducing pipe 21 is decreased in order to reduce the pressure in the holes 11, 11 . . . 11 of the rotor 10 on the block 52 side which open to the depression 25 thereby drawing air in the vicinity of the parts-conveying surface 10a. Accordingly, the works 1 nearby can be drawn and held.

Figure 8:
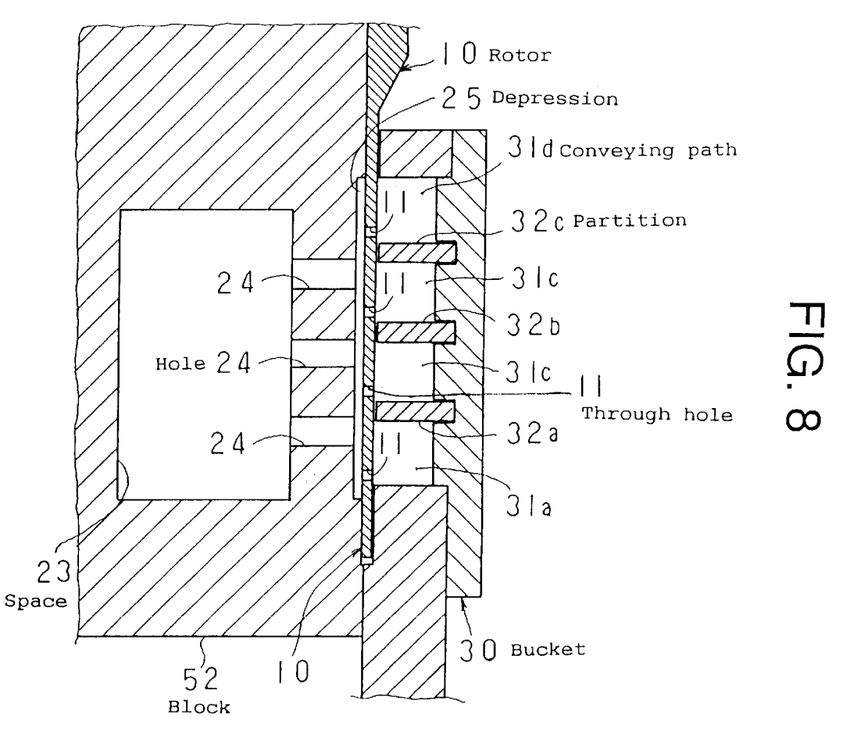
FIG. 8 is an explanatory view (cross sectional view) showing a structure for drawing parts to the rotor.

FIG. 8 is an enlarged cross sectional view showing a part in FIG. 1, for explaining the relationship between the rotor 10 and the bucket 30, and the rotor 10 and the space 23 in the block 52. Faces of the conveying paths 31a, 31b, 31c, and 31d, which are open to the rotor 10, slidably come into contact with the parts-conveying surface 10a of the rotor 10. Partitions 32a, 32b, and 32c are provided between the conveying paths 31a and 31b, 31b and 31c, and 31c and 31d respectively for preventing the works from going to the adjacent path, and have a slight space between the parts-conveying-surface 10a of the rotor 10.

Figure 9:
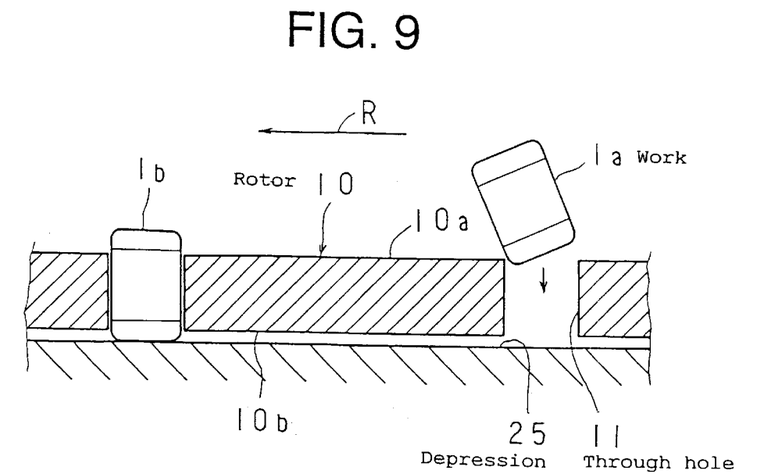
FIG. 9 is an explanatory view (cross sectional view) showing a state in which a work is drawn to a parts-conveying surface.

FIG. 9 is a cross sectional view for explaining a state in which the work 1 is drawn to the parts-conveying surface 10a. The through holes 11, 11 . . . 11 of the rotor 10 are formed so that the work 1 fits therein with enough room for the work 1 to come in or out. The rotor 10 is intermittently rotated in the direction of arrow R in FIG. 9, and the work 1 (1a, 1b, or the like) is mixed with air in the conveying path so that the work levitates. The work 1a in FIG. 9 is in a state just before being fitted in the through hole 11, and the work 1b is in a state after being fitted in the through hole 11.

Since the air pressure on the surface 10b opposite to the parts-conveying surface 10a is decreased, the works 1, 1 . . . 1 fitted in the through holes 11 of the rotor 10 are drawn to the surface of the thin depression 25 facing the surface 10b of the rotor 10 until an end face of each of the works 1, 1 . . . 1 comes in contact therewith. The works 1, 1 . . . 1 are each held at a specified position in the through hole 11 in this state when the rotor is stopped and also when the rotor is rotating.

Figure 10:
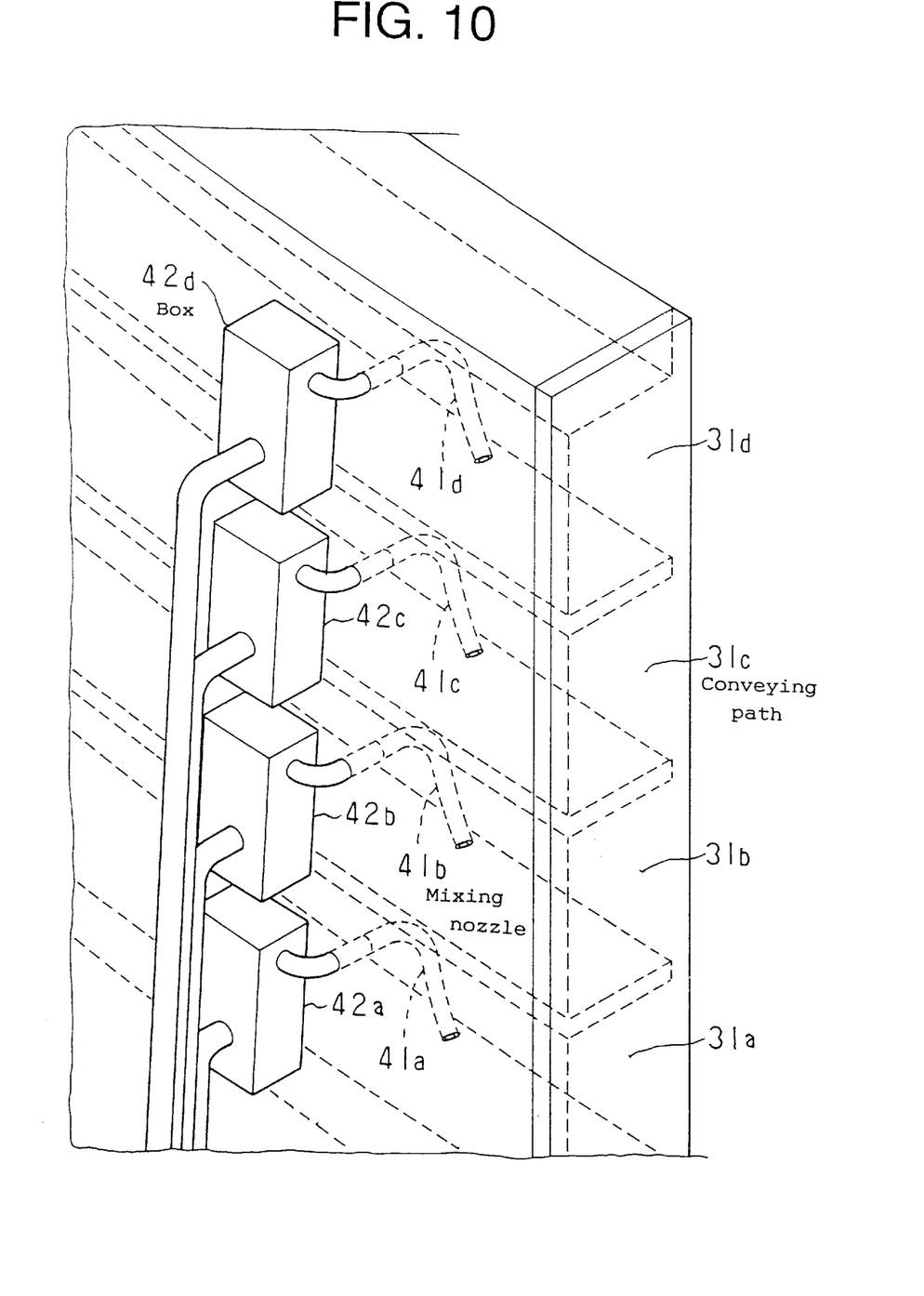
FIG. 10 is a perspective view of an embodiment of a parts mixing means.
Figure 11:
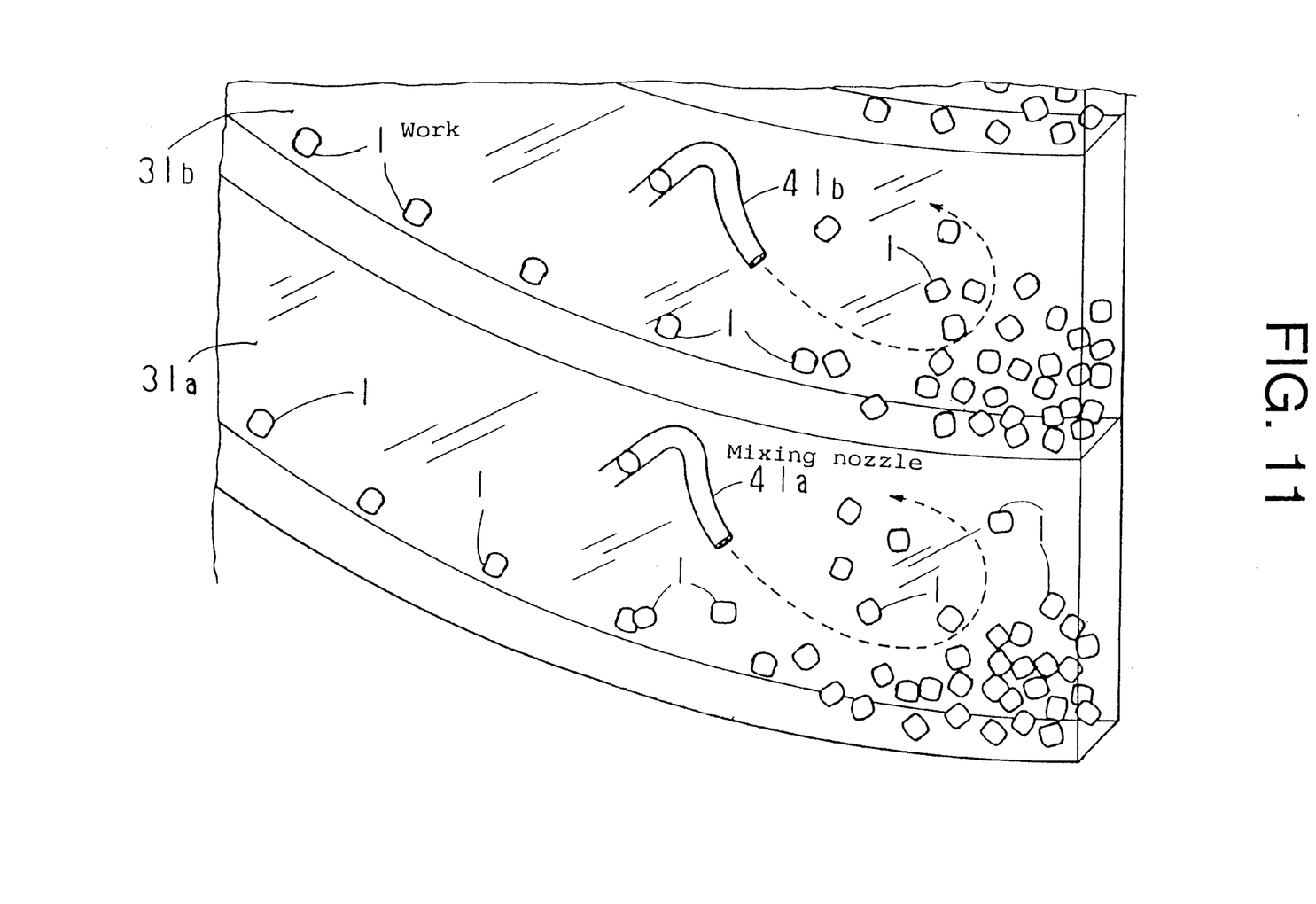
FIG. 11 is a perspective view showing a state of mixing the works in a conveying passage.

FIG. 10 is a perspective view showing an embodiment of a parts mixing means having the mixing nozzles 41a, 41b, 41c, and 41d. FIG. 11 is a perspective view showing an example of a state in which the works 1, 1 . . . 1 in the conveying paths are mixed. The mixing nozzles 41a, 41b, 41c, and 41d are arranged in such a manner that an airflow blown from each end mixes the works 1 appropriately. The direction of the blowing can be finely adjusted by changing the position or orientation of boxes 42a, 42b, 42c, and 42d at the base of the nozzles, relative to each of the conveying paths 31a, 31b, 31c, and 31d.

As shown in FIG. 11, the works 1, 1 . . . 1 in the conveying paths 31a, 31b, 31c, and 31d are appropriately mixed by a positive pressure air blown from the mixing nozzles 41a, 41b, 41c, and 41d. Almost all of the works 1, 1 . . . 1 stirred up by the mixing-are each drawn to the through holes 11, 11 . . . 11 and are fitted therein due to negative pressure air while the rotor 10 is rotated to be moved. If only an appropriate value of the balance between the mixing of the works 1, 1 . . . 1 and the drawing to the through holes 11, 11 . . . 11 is selected, a high speed arrangement and conveyance of the works 1, 1 . . . 1 can easily be realized.

Figure 13:
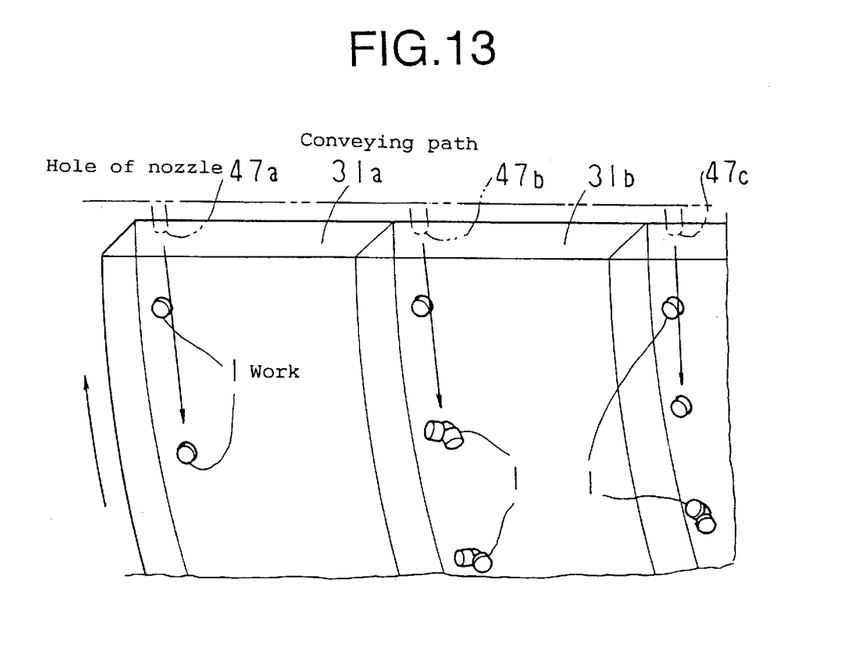
FIG. 13 is an explanatory view (perspective view) showing the motion of the blowoff nozzle.

FIG. 12 is an explanatory view (cross sectional view) showing the relative positions of the parts feed chute 55 and the blowoff nozzle 45 to the bucket 30 and the rotor 10. FIG. 13 is an explanatory view (perspective view) showing a state in which the excessive works 1 are blown off with the pressure of the air blown from holes 47a, 47b, 47c, and 47d of the blowoff nozzle 45.

As shown in FIGS. 12 and 13, a positive pressure air is supplied to the interior 46 of the blowoff nozzle 45 from an air pressure supply (not shown), the air blown from the holes 47a, 47b, 47c, and 47d are blown along the lines of the trains 12a, 12b, 12c, and 12d of the works 1, 1 . . . 1, and are directed to positions at which the works 1 stop when the rotor 10 stops during the intermittent movement of the rotation.

In this instance, since the drawing strength to the through holes 11 varies depending on the works, when the plurality of works 1 coming to this position are held, the work 1 to which a week strength is applied is blown off at first and the last remaining work 1 is held on the parts-conveying surface 10a with a stable strength and is fed to the next processing position.

Work that did not come into the through holes 11, 11 . . . 11 due to a burr or because it failed to meet a tolerance in the outside dimension of the works 1, 1 . . . 1 remains in a container and thus, does not cause blocking in the feed device so that the function of the entire apparatus is not damaged.

Although a specific embodiment in which a rotor is used as the movable section in the conveying device has been described, a similar result may be obtained even if other conveying devices such as an endless belt are used. In addition, it is to be understood that various changes and modifications in the structure and form of the parts of the apparatus, such as a conveying path and its cover, and a container, may be made in the invention without departing from the spirit and scope thereof.

As described above, according to the present invention, there are provided the movable section having the plurality of through holes arranged along the conveying direction on the parts-conveying surface and a cover of the conveying path for slidably covering the upper part of the movable section, in which a pressurized air is blown to the parts from the nozzles provided in the cover to mix them, and the pressure of air on the opposite side in the vicinity of the through holes is decreased to draw the parts to each hole and to convey them, thereby preventing the parts from stopping due to tangling even if some parts have a burr or exceed the tolerance in the outside dimension.

Accordingly, the present invention has advantages in that no parts are stopped during the conveyance or obstruct the outlet, thus stable conveyance and feeding at a high speed can be realized. Also, the above advantages can be further improved by arranging the plurality of trains having the through holes in parallel, grouping them in correspondence with each of the trains of the conveying paths, and providing the parts mixing means for each section.

What is claimed is:

1. A small-parts feed and conveying device comprising:
    a movable section comprising trains forming a plurality of separated through holes; said trains being are arranged along the direction of conveying small parts on a parts-conveying surface;
    parts drawing means for drawing the small parts during conveyance to the parts-conveying surface and for temporarily holding them against said surface by reducing the pressure of air in the vicinity of the through holes opposite to the parts-conveying surface of the movable section;
    a conveying path cover comprising a plurality of open faces forming, with said surface, spaces in which the small parts are enclosed; said cover slidably contacting the parts-conveying surface; and
    parts mixing means adapted for blowing a pressurized air to the small parts through nozzles provided in the conveying path cover and for mixing the small parts in the conveying path cover.

2. A small-parts feed and conveying device according to claim 1, wherein a principal composing element of the movable section is a rotor or a belt for conveying.

3. A small-parts feed and conveying device according to claim 2, wherein:
    the trains having the through holes on the parts-section conveying surface of the movable section are plural and are arranged in parallel;
    the spaces in the conveying path cover for enclosing the small parts are divided corresponding to each of the plurality of trains; and
    the parts mixing means individually mixes the small parts in the divided spaces.

* * * * *